(12) United States Patent
Li (10) Patent No.: US 12,089,584 B2
(45) Date of Patent: Sep. 17, 2024

(54) PCB WIRING HEATING TYPE MOSQUITO REPELLENT DEVICE

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 28 days.

(21) Appl. No.: 18/300,830

(22) Filed: Apr. 14, 2023

(65) Prior Publication Data

US 2024/0099291 A1    Mar. 28, 2024

(30) Foreign Application Priority Data

Sep. 22, 2022  (CN) .......................... 202222515806.7

(51) Int. Cl.
  *A01M 29/12*  (2011.01)
  *A01M 29/18*  (2011.01)
  *H05B 1/02*   (2006.01)

(52) U.S. Cl.
  CPC ............ *A01M 29/12* (2013.01); *A01M 29/18* (2013.01); *H05B 1/023* (2013.01); *H05B 2203/005* (2013.01)

(58) Field of Classification Search
  CPC ....... A01M 29/12; A01M 29/18; H05B 1/023; H05B 2203/005
  See application file for complete search history.

(56) References Cited

U.S. PATENT DOCUMENTS 11,937,595 B2 *  3/2024  Gao ...................... F24H 3/0411

* cited by examiner

*Primary Examiner* — Yvonne R Abbott-Lewis
(74) *Attorney, Agent, or Firm* — Westbridge IP LLC (57) ABSTRACT

Disclosed is a PCB wiring heating type mosquito repellent device, which integrates two functions of ultrasonic mosquito repelling and mosquito repelling with an electric mosquito repellent mat. Meantime, the mosquito repellent device is provided with a plurality of heating sheets which may work independently. One side of a PCB heating panel is provided with a plurality of heating areas, and each heating area corresponds to one of the heating sheets. One side face of the heating sheet is connected with the heating area, and the other side face of the heating sheet is connected with the electric mosquito repellent mat. A heating wire is evenly laid in each heating area, and the heating wires in adjacent heating areas are connected in parallel and may supply power and heat independently.

10 Claims, 5 Drawing Sheets

PCB WIRING HEATING TYPE MOSQUITO REPELLENT DEVICE

CROSS-REFERENCE TO RELATED APPLICATIONS

This application claims priority to Chinese Patent Application No. 202222515806.7, filed on Sep. 22, 2022, the content of which is incorporated herein by reference in its entirety.

TECHNICAL FIELD

The application relates to the technical field of daily necessities, in particular to a Printed Circuit Board (PCB) wiring heating type mosquito repellent device.

BACKGROUND

It is well-known that mosquitoes and flies can spread various diseases among humans and livestock, which is extremely harmful. Therefore, mosquito nets, window screens and mosquito coils are often used to avoid the harm of the mosquitoes and flies. Many technologies have also been developed to eliminate or repel the mosquitoes and flies, such as pesticides, mosquito killer lamps and electronic mosquito repellent devices with great efforts and explorations made. Though the mosquitoes and flies are repelled, mosquito repellent incense and the pesticides pollute the environment, endangering people's health. Although the mosquito killer lamp, the mosquito repellent device and the like have certain effects, the effect is not obvious as the key point of repelling the mosquitoes and flies is not learned.

The mosquitoes have a keen sense of smell system, which can distinguish carbon dioxide gas exhaled by mammals within 30 meters. On the contrary, the mosquitoes have long predicted an unpleasant smell. The mosquitoes may not enter if there is the unpleasant smell within a certain range. All mosquito repellent devices make use of this feature. For the electronic mosquito repellent device, an electric heating diffusion mode is generally employed to achieve mosquito repellent odor diffusion, which has poor use effect and poor user experience.

SUMMARY

The application provides a PCB wiring heating type mosquito repellent device to solve the problem that the mosquito repellent device in a traditional art has a single working mode and cannot adapt to various use scenarios.

The application provides a PCB wiring heating type mosquito repellent device, which includes a base and a mosquito repellent box arranged on the base.

The mosquito repellent box includes a PCB heating panel, a fan bracket, a fan, an upper cover, a plurality of heating sheets and an accommodating area for accommodating an electric mosquito repellent mat. The fan bracket is fixedly connected to the base, and the fan is arranged on the fan bracket. The PCB heating panel is connected with the heating sheet and the fan. One side of the PCB heating panel is provided with a plurality of heating areas, and each heating area corresponds to one of the heating sheets. One side face of the heating sheet is connected with the heating area, and the other side face of the heating sheet is connected with the electric mosquito repellent mat. A heating wire is evenly laid in each of the heating areas, and the heating wires in adjacent heating areas are connected in parallel and may supply power and heat independently. Each of the heating wires is provided with a resistance adjusting structure for adjusting the length of the heating wire connected into a circuit, so as to adjust the temperature by adjusting the access length of the heating wire. A temperature sensor is arranged on the other side of the PCB heating panel.

Preferably, a rechargeable power supply module and an ultrasonic emission module are arranged in the base, and the rechargeable power supply module is connected with the ultrasonic emission module.

Preferably, an accommodating seat for accommodating the mosquito repellent box is arranged on the base, a power output interface is arranged in the accommodating seat, the power output interface is connected with the rechargeable power supply module, a power input interface is arranged in the mosquito repellent box, and when the mosquito repellent box is placed in the accommodating seat, the power input interface in the mosquito repellent box is connected to the power output interface.

Preferably, the base is provided with a through hole, the fan bracket is provided with an air guide grille, the upper cover is provided with an annular diffusion tuyere, and the through hole, the air guide grille and the diffusion tuyere form an air guide duct from the base to the upper cover.

Preferably, the upper cover is also provided with a function button, and the function button is configured to enter different working modes by adjusting the number of turn-on heating areas and adjusting the fan to be turned on or off. The working modes include an indoor working mode and an outdoor working mode. In the indoor working mode, part of the heating areas is alternately turned on to work and the fan is turned off. In the outdoor working mode, all the heating areas are turned on to work and the fan is turned on.

Preferably, the base is provided with a display interface, and the display interface is provided with a plurality of electric quantity display lamps configured to display remaining electric quantity of the rechargeable power supply module and a plurality of mode display lamps configured to display the working mode. The mode display lamp includes an outdoor mode Light-Emitting Diode (LED) display lamp configured to display the outdoor working mode, an indoor mode LED display lamp configured to display the indoor working mode, and an ultrasonic mode display lamp configured to display an ultrasonic mode.

Preferably, the base is also provided with a TYPE-C interface, and the TYPE-C interface is configured to automatically identify and charge a Universal Serial Bus (USB) load, and automatically turn off output when output voltage of the rechargeable power supply module is lower than 3V so as to protect the rechargeable power supply module.

Preferably, the ultrasonic emission module includes a plurality of 40 KHz ultrasonic generators.

Preferably, the bottom of the fan bracket is provided with a plurality of staggered spines so as to form a hollow heat dissipation space over the rechargeable power supply module.

Preferably, the upper cover is detachably connected with the base, and a plurality of air vents are formed in the side face of the upper cover so as to connect the outside and internal space of the mosquito repellent device.

The embodiments of the application provide the PCB wiring heating type mosquito repellent device, which integrates two functions of ultrasonic mosquito repelling and mosquito repelling with the electric mosquito repellent mat. Meantime, the mosquito repellent device is provided with a plurality of heating sheets which may work independently. One side of the PCB heating panel is provided with a plurality of heating areas, and each heating area corresponds to one of the heating sheets. One side face of the heating sheet is connected with the heating area, and the other side face of the heating sheet is connected with the electric mosquito repellent mat. The heating wire is evenly laid in each heating area, and the heating wires in adjacent heating areas are connected in parallel and may supply power and heat independently. Each heating wire is provided with the resistance adjusting structure for adjusting the length of the heating wire connected into a circuit, so as to adjust the temperature by adjusting the access length of the heating wire. That is, a plurality of corresponding electric mosquito repellent mats may work independently and may also work jointly, and the heating value of a single heating area may also be adjusted, so that the mosquito repellent device may adapt to application scenarios of different sizes of spaces. Moreover, the fan is arranged inside, and air guide is performed by the fan, so that the range of odor emission of the mosquito repellent can be expanded. Meanwhile, the rechargeable power supply module also adapts to different application scenarios and can automatically identify and charge the USB load.

BRIEF DESCRIPTION OF THE DRAWINGS

In order to more clearly explain the technical solutions in the embodiments of the application or in the traditional art, the drawings required in the descriptions of the embodiments or the traditional art will be briefly introduced below. It is apparent that the drawings in the following descriptions are some embodiments of the application. Those of ordinary skill in the art may also obtain other drawings in accordance with these drawings without paying creative labour.

DETAILED DESCRIPTION OF THE EMBODIMENTS

In order to make the purposes, technical solutions and advantages of the embodiments of the application clearer, the technical solutions in the embodiments of the application will be clearly and completely described below in combination with the drawings in the embodiments of the application, and it is apparent that the described embodiments are only a part rather all of embodiments of the application. All other embodiments obtained by those of ordinary skill in the art on the basis of the embodiments in the application without creative work shall fall within the scope of protection of the application.

The term "and/or" in the embodiments of the disclosure describes only an association relationship for describing associated objects and represents that three relationships may exist. For example, A and/or B may represent the following three cases: Only A exists, both A and B exist, and only B exists.

Terms "first" and "second" in the embodiments of the disclosure are only used for describing purposes, and cannot be understood as indicating or implying relative importance or implicitly indicating the number of indicated technical features. Therefore, the features defined with "first" and "second" may include at least one of the features explicitly or implicitly. In the description of the disclosure, terms "include" and "have" and any variations thereof are intended to cover non-exclusive inclusion. For example, a system, product or device including a series of components or units is not limited to the components or units which are listed, but may alternatively further include components or units which are not listed or alternatively further include other components or units intrinsic to the product or device. In the descriptions of the disclosure, "multiple" means at least two, for example, two and three, unless otherwise limited definitely and specifically.

Reference to an "embodiment" herein means that a particular feature, structure or characteristic described in connection with an embodiment may be included in at least one embodiment of the disclosure. The appearance of this phrase in various places in the specification does not necessarily mean the same embodiment, nor is it an independent or alternative embodiment mutually exclusive with other embodiments. Those skilled in the art understand explicitly and implicitly that the embodiments described herein may be combined with other embodiments.

The mosquitoes have a keen sense of smell system, which can distinguish carbon dioxide gas exhaled by mammals within 30 meters. On the contrary, the mosquitoes have long predicted an unpleasant smell. The mosquitoes may not enter if there is the unpleasant smell within a certain range. All mosquito repellent devices make use of this feature. For the electronic mosquito repellent device, an electric heating diffusion mode is generally employed to achieve mosquito repellent odor diffusion, which has poor use effect and poor user experience.

Therefore, the embodiments of the application provide a PCB wiring heating type mosquito repellent device, which integrates two functions of ultrasonic mosquito repelling and mosquito repelling with an electric mosquito repellent mat. Meantime, the mosquito repellent device is provided with a plurality of heating sheets which may work independently. That is, a plurality of corresponding electric mosquito repellent mats may work independently and may also work jointly, so that the mosquito repellent device may adapt to application scenarios of different sizes of spaces. Moreover, the fan is arranged inside, and air guide is performed by the fan, so that the range of odor emission of the mosquito repellent can be expanded. Meanwhile, the rechargeable power supply module also adapts to different application scenarios and can automatically identify and charge a USB load. Explanation and introduction will be made below with reference to a plurality of embodiments.

FIGS. 1 to 6 provide a PCB wiring heating type mosquito repellent device according to the embodiments of the application, which includes a base 30, a mosquito repellent box 1 and a top cover 20.

An upper cover iron sheet 21 and a fixed upper internal cover 22 are arranged inside the top cover 20.

The base 30 includes an upper shell 301, a middle frame 302 and a base plate 303. A rechargeable power supply module 37 and an ultrasonic emission module 33 are arranged in the base 30, and the rechargeable power supply module 37 is connected with the ultrasonic emission module 33. A magnet 38 is arranged below the rechargeable power supply module 37, a battery pack Ethyl Vinyl Acetate (EVA) gasket 39 is attached above the rechargeable power supply module 37, and a main PCB board 36 is also arranged above the rechargeable power supply module 37. An ultrasonic emission die set 34 and an ultrasonic silicone sleeve 35 are arranged at one end of the ultrasonic emission module 33. An ultrasonic fixing iron sheet 32 is arranged inside the base plate 303, and the ultrasonic fixing iron sheet 32 is fixed on a PTC bracket 7.

An accommodating seat for accommodating the mosquito repellent box is arranged on the base 30, a power output interface is arranged in the accommodating seat, the power output interface is connected with the rechargeable power supply module, a power input interface is arranged in the mosquito repellent box, and when the mosquito repellent box is placed in the accommodating seat, the power input interface in the mosquito repellent box is connected to the power output interface.

The mosquito repellent box 1 includes the base 30, a PCB heating panel, a fan bracket 5, a fan 3, an upper cover 2 and a plurality of heating sheets.

The rechargeable power supply module and the ultrasonic emission module are arranged inside the base 30. The rechargeable power supply module is connected with the ultrasonic emission module and the main PCB board 36. A power adapter of the rechargeable power supply module has sufficient power supply capacity (input power), that is, a fixed mosquito repellent device charges a battery pack with the maximum (10 W non-fast charging/18 W fast charging) charging power. The bottom of the fan bracket is provided with a plurality of staggered spines so as to form a hollow heat dissipation space above the rechargeable power supply module.

Figure 1:
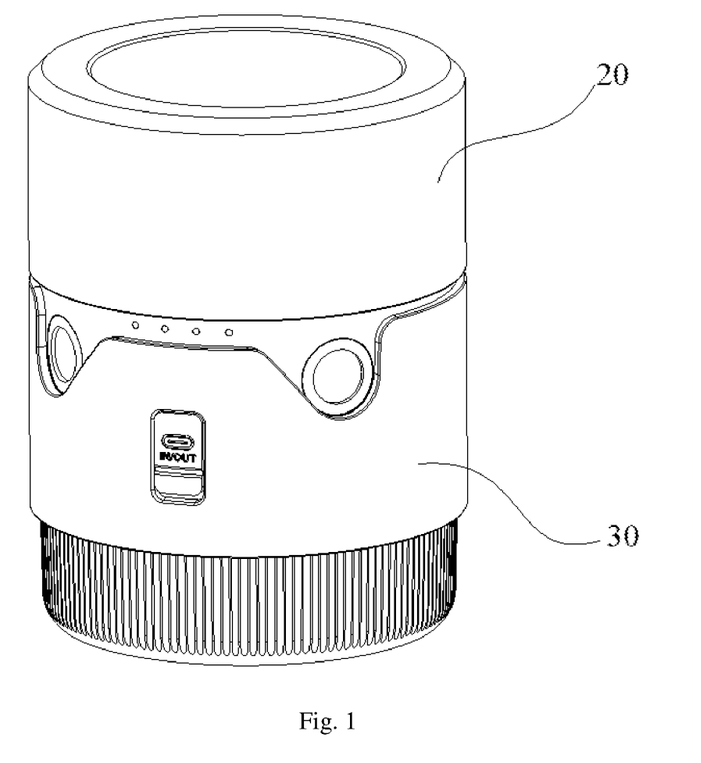
FIG. 1 is a solid diagram of a mosquito repellent device according to an embodiment of the application.
Figure 2:
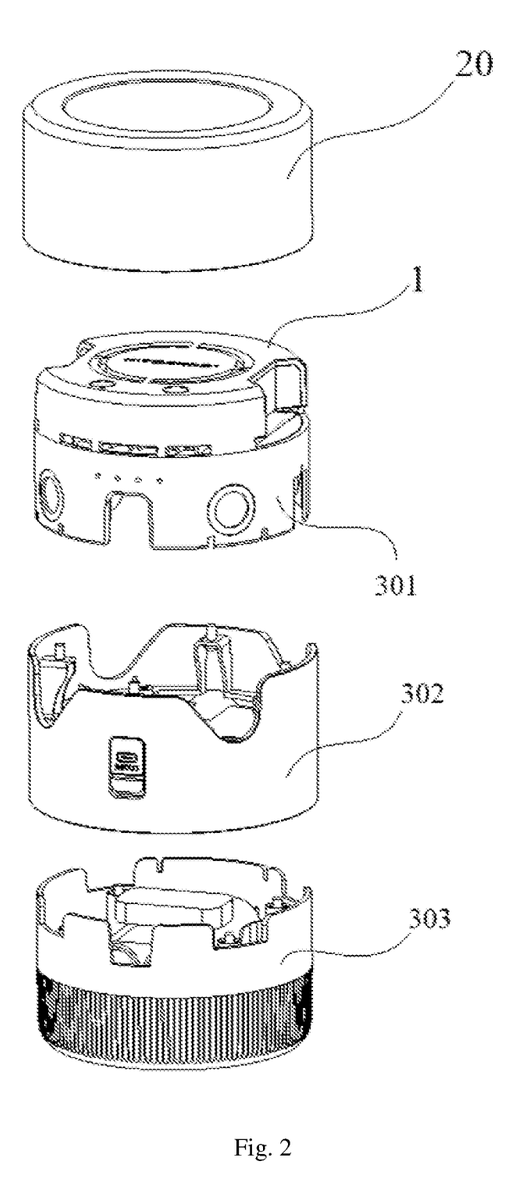
FIG. 2 is a preliminary disassembly diagram of a mosquito repellent device according to an embodiment of the application.

As shown in FIG. 1 and FIG. 2, the bottom of the base 30 is provided with a supporting foot, and an accommodating space is provided above the bottom for accommodating the rechargeable power supply module and the ultrasonic emission module. The base 30 is provided with a display interface, and the display interface is provided with a plurality of electric quantity display lamps for displaying remaining electric quantity of the rechargeable power supply module. As shown in FIG. 2, an LED lamp board 6 is further included, and the LED lamp board 6 is connected to the main PCB board 36. The base 30 is provided with an LED board mounting position, and the structure thereof is matched with the structure of the LED board 6. An LED lamp hole 11 is formed at a corresponding position on the upper cover to expose the electric quantity display lamp on the LED lamp board 6. In the present embodiment, four blue electric quantity display lamps (the flash of a first lamp indicates that the remaining electric quantity is 0-25%, the flash of a second lamp indicates that the remaining electric quantity is 25-50%, the flash of a third lamp indicates that the remaining electric quantity is 50-75%, and the flash of a fourth lamp indicates that the remaining electric quantity is 75-100%) are arranged. When the electric quantity is less than 10%, the first lamp flashes to prompt low power, and when the function is turned off, there is a gear memory function in the case of uninterrupted power supply. A plurality of mode display lamps for displaying working modes are also arranged. The mode display lamps include an outdoor mode LED display lamp for displaying an outdoor working mode, an indoor mode LED display lamp for displaying an indoor working mode, and an ultrasonic mode display lamp for displaying an ultrasonic mode.

Figure 3:
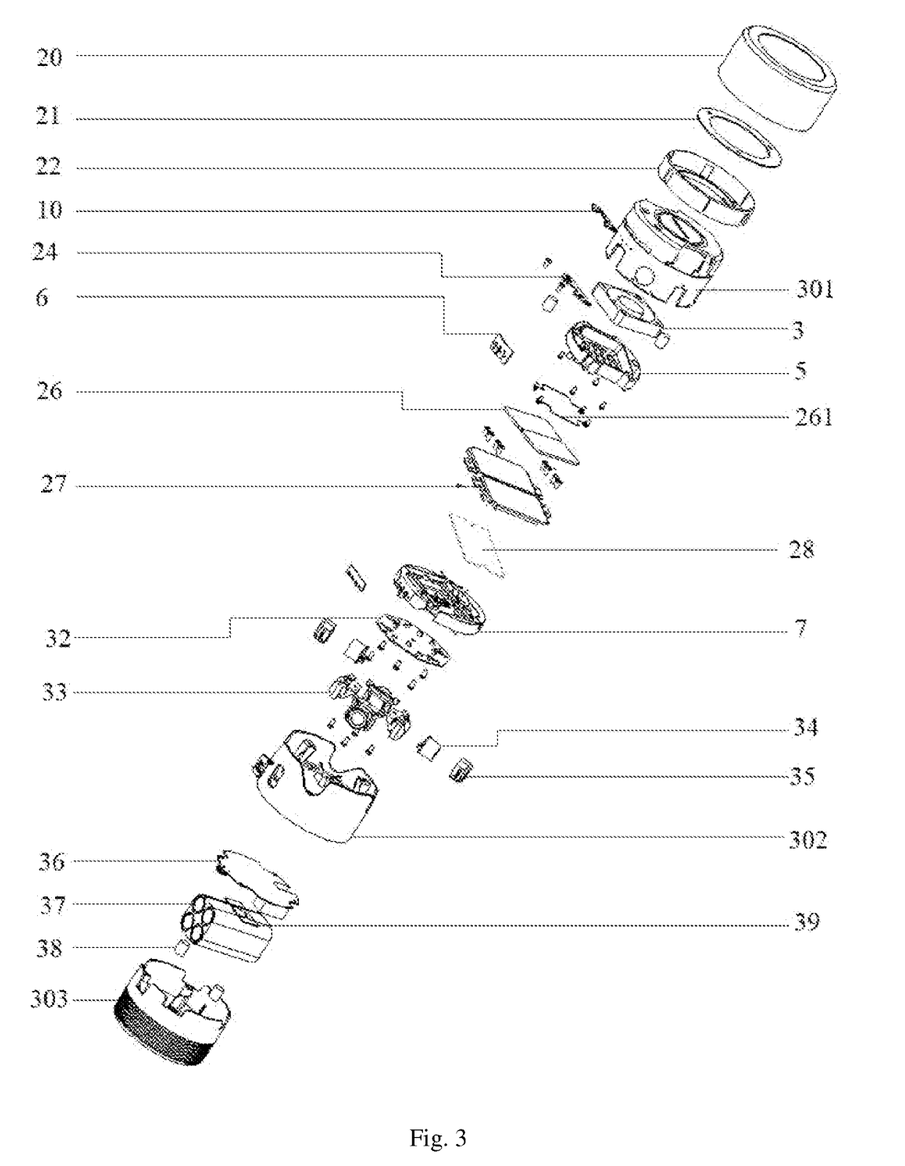
FIG. 3 is a structural explosive view of a mosquito repellent device according to an embodiment of the application.
Figure 4:
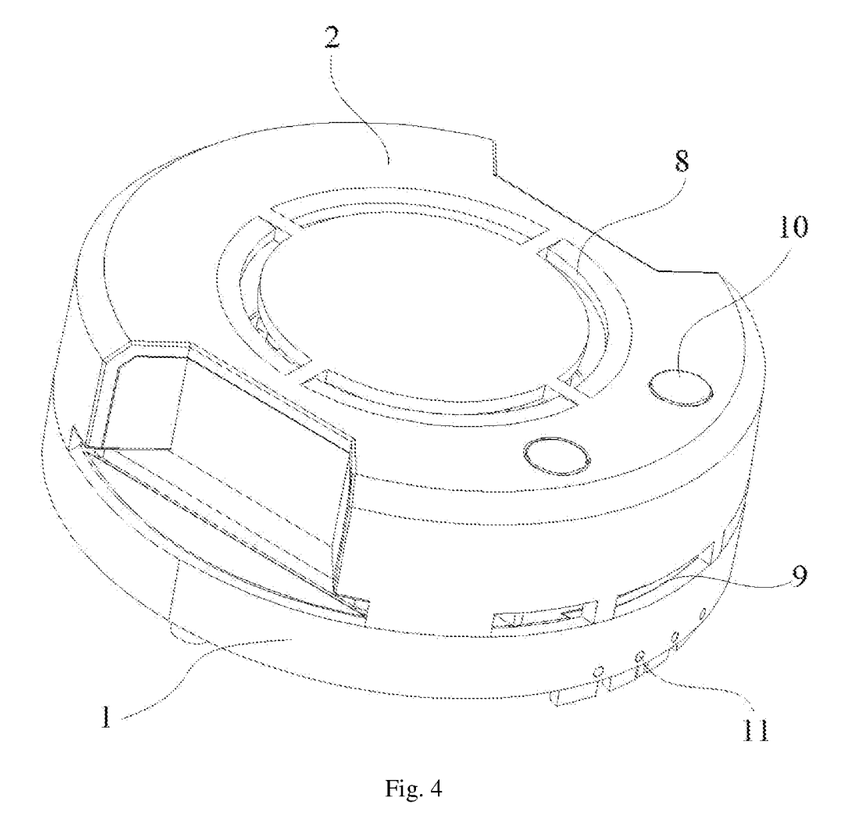
FIG. 4 is a solid diagram of a mosquito repellent box according to an embodiment of the application.
Figure 5:
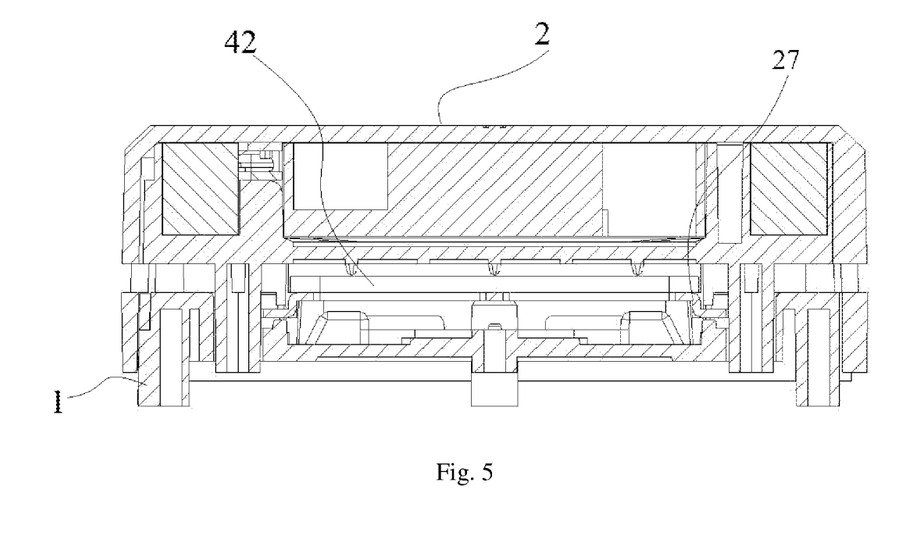
FIG. 5 is a section view of a mosquito repellent box according to an embodiment of the application.
Figure 6:
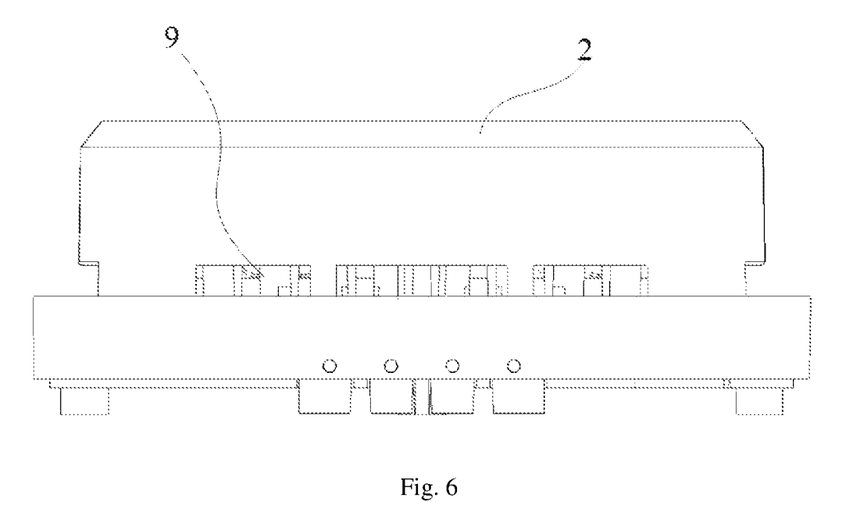
FIG. 6 is a lateral view of a mosquito repellent box according to an embodiment of the application.

One side of the PCB heating panel is provided with a plurality of heating areas, and each heating area corresponds to one of the heating sheets. One side face of the heating sheet is connected with the heating area, and the other side face of the heating sheet is connected with the electric mosquito repellent mat. A heating wire is evenly laid in each of the heating areas, and the heating wires in adjacent heating areas are connected in parallel and may supply power and heat independently. Each of the heating wires is provided with a resistance adjusting structure for adjusting the length of the heating wire connected into a circuit, so as to adjust the temperature by adjusting the access length of the heating wire. An accommodating area 42 for accommodating the electric mosquito repellent mat is further included. The heating sheet 27 is connected with the electric mosquito repellent mat 26, and the electric mosquito repellent mat is pressed on the heating sheet 27 by an elastic mosquito repellent mat pressing wire 261. The heating sheet 27 is an aluminum sheet, and the heating sheet 27 is fixed by a heating fixed aluminum sheet. The other side of the PCB heating panel 28 is also provided with a temperature sensor, and the temperature sensor is connected to the PCB heating panel 28 through PTC and may be subjected to temperature feedback control by a Microprogrammed Control Unit (MCU). The fan bracket 5 is fixedly connected to the base, the fan is installed on the fan bracket, and the PCB heating panel 28 is connected with the heating sheet 27 and the fan. In the present embodiment, two heating areas are arranged, and the two heating areas may heat alternately or jointly.

In the present embodiment, the upper cover 2 is also provided with a function button 10 and a key PCB 24. The function button 10 is configured to enter different working modes by adjusting the number of turn-on heating areas and adjusting the fan 3 to be turned on or off. The working modes include an indoor working mode and an outdoor working mode. In the indoor working mode, part of the heating areas is alternately turned on to work and the fan 3 is turned off. In the outdoor working mode, all the heating areas are turned on to work and the fan is turned on.

On the basis of the above embodiment, as a preferred implementation, two function buttons S1 and S2 are arranged in the present embodiment. The S1 function button is long pressed to start heating, short pressed to select the indoor mode or outdoor mode, and then long pressed to turn off. The S2 function button is long pressed to turn on ultrasonic wave, and then long pressed to turn off.

Specifically, the S1 function button is long pressed to turn on an electric mosquito repellent incense function, and a blue or green LED is arranged at the key position to display the current mode (a blue outdoor working mode and a green indoor working mode). The key position is clicked to change the mode and long pressed to turn off. Details of key selection and working mode are shown in the following table:

|  | Indoor | Outdoor |
| --- | --- | --- |
| Click | Turn-off of the fan | The fan works for 1S and stops for 5S. |
|  | A single heating area works, and the heating area is switched every 6 hours. | Double heating areas work simultaneously. |
|  | The green lamp keeps on. | The blue lamp keeps on. |

The S2 function button is long pressed to turn on the ultrasonic function, and the blue LED lamp at the key position keeps on, which indicates turn-on. Four 40 KHz ultrasonic generators work simultaneously. The S2 function button is long pressed to turn off the function, and the blue LED lamp goes out. Four blue LED lamps display the electric quantity (0-25% by the first lamp, 25~50% by the second lamp, 50~75% by the third lamp and 75~100% for the fourth lamp). When the electric quantity is less than 10%, the first lamp flashes to indicate low power.

On the basis of the above embodiment, as a preferred implementation, the base is provided with a through hole, the fan bracket is provided with an air guide grille, the upper cover is provided with an annular diffusion tuyere 8, and the through hole, the air guide grille and the diffusion tuyere 8 form an air guide duct from the base to the upper cover.

On the basis of the above embodiment, as a preferred implementation, the base is also provided with a TYPE-C interface, and the TYPE-C interface is configured to automatically identify and charge a USB load, and automatically turn off output when output voltage of the rechargeable power supply module is lower than 3V so as to protect the rechargeable power supply module. When the TYPE-C interface is not plugged in, and the electric mosquito repellent incense function and ultrasonic function are not turned on, a sleep mode is entered after about 30S, and all LEDs are turned off. The TYPE-C interface is plugged in or the key is short or long pressed so that the system can be activated.

On the basis of the above embodiment, as a preferred implementation, the upper cover 2 is detachably connected with the base 30, and a plurality of air vents 9 are formed in the side face of the upper cover 2 so as to connect the outside and internal space of the mosquito repellent device.

In conclusion, the embodiments of the application provide the PCB wiring heating type mosquito repellent device, which integrates two functions of ultrasonic mosquito repelling and mosquito repelling with the electric mosquito repellent mat. Meantime, the mosquito repellent device is provided with a plurality of heating sheets which may work independently. That is, a plurality of corresponding electric mosquito repellent mats may work independently and may also work jointly, and the heating value of a single heating area may also be adjusted, so that the mosquito repellent device may adapt to application scenarios of different sizes of spaces. Moreover, the fan is arranged inside, and air guide is performed by the fan, so that the range of odor emission of the mosquito repellent can be expanded. Meanwhile, the rechargeable power supply module also adapts to different application scenarios and can automatically identify and charge the USB load.

The last thing to be noted is: the above embodiments are only used to illustrate the technical solutions of the application and not used to limit the same. Although the application has been described in detail with reference to the foregoing embodiments, for those skilled in the art, they can still modify the technical solutions described in the foregoing embodiments, or equivalently replace part of the technical features; all these modifications and replacements shall not cause the essence of the corresponding technical solutions to depart from the spirit and scope of protection of the application.

What is claimed is:

1. A printed circuit board (PCB) wiring heating type mosquito repellent device, comprising a base and a mosquito repellent box arranged on the base, wherein
    the mosquito repellent box comprises a PCB heating panel, a fan bracket, a fan, an upper cover, a plurality of heating sheets and an accommodating area for accommodating an electric mosquito repellent mat, wherein the fan bracket is fixedly connected to the base, the fan is arranged on the fan bracket, the PCB heating panel is connected with the heating sheet and the fan, one side of the PCB heating panel is provided with a plurality of heating areas, each heating area corresponding to one of the heating sheets, one side face of the heating sheet is connected with the heating area, the other side face of the heating sheet is connected with the electric mosquito repellent mat, a heating wire is evenly laid in each of the heating areas, the heating wires in adjacent heating areas are connected in parallel and are capable of supplying power and heat independently, each of the heating wires is provided with a resistance adjusting structure for adjusting the length of the heating wire connected into a circuit, so as to adjust the temperature by adjusting the access length of the heating wire, and a temperature sensor is arranged on the other side of the PCB heating panel.

2. The PCB wiring heating type mosquito repellent device according to claim 1, wherein a rechargeable power supply module and an ultrasonic emission module are arranged in the base, the rechargeable power supply module is connected with the ultrasonic emission module.

3. The PCB wiring heating type mosquito repellent device according to claim 2, wherein the upper cover is also provided with a function button, the function button is configured to enter different working modes by adjusting the number of turn-on heating areas and adjusting the fan to be turned on or off, the working modes comprising an indoor working mode and an outdoor working mode, in the indoor working mode, part of the heating areas is alternately turned on to work and the fan is turned off, and in the outdoor working mode, all the heating areas are turned on to work and the fan is turned on.

4. The PCB wiring heating type mosquito repellent device according to claim 3, wherein the base is provided with a display interface, the display interface is provided with a plurality of electric quantity display lamps configured to display remaining electric quantity of the rechargeable power supply module and a plurality of mode display lamps configured to display the working mode, wherein the mode display lamp comprises an outdoor mode LED display lamp configured to display the outdoor working mode, an indoor mode LED display lamp configured to display the indoor working mode, and an ultrasonic mode display lamp configured to display an ultrasonic mode.

5. The PCB wiring heating type mosquito repellent device according to claim 2, wherein the base is also provided with a TYPE-C interface, the TYPE-C interface is configured to automatically identify and charge a universal serial bus (USB) load, and automatically turn off the output when output voltage of the rechargeable power supply module is lower than 3V so as to protect the rechargeable power supply module.

6. The PCB wiring heating type mosquito repellent device according to claim 2, wherein the ultrasonic emission module comprises a plurality of 40 KHz ultrasonic generators.

7. The PCB wiring heating type mosquito repellent device according to claim 2, wherein the bottom of the fan bracket is provided with a plurality of staggered spines so as to form a hollow heat dissipation space over the rechargeable power supply module.

8. The PCB wiring heating type mosquito repellent device according to claim 1, wherein an accommodating seat for accommodating the mosquito repellent box is arranged on the base, a power output interface is arranged in the accommodating seat, the power output interface is connected with the rechargeable power supply module, a power input interface is arranged in the mosquito repellent box, and when the mosquito repellent box is placed in the accommodating seat, the power input interface in the mosquito repellent box is connected to the power output interface.

9. The PCB wiring heating type mosquito repellent device according to claim 1, wherein the base is provided with a through hole, the fan bracket is provided with an air guide grille, the upper cover is provided with an annular diffusion tuyere, and the through hole, the air guide grille and the diffusion tuyere forming an air guide duct from the base to the upper cover.

10. The PCB wiring heating type mosquito repellent device according to claim 1, wherein the upper cover is detachably connected with the base, a plurality of air vents are formed in the side face of the upper cover so as to connect the outside and internal space of the PCB wiring heating type mosquito repellent device.

\* \* \* \* \*